United States Patent
Shah

(10) Patent No.: US 8,170,543 B1
(45) Date of Patent: May 1, 2012

(54) CODE DOMAIN POWER DISPLAY

(75) Inventor: Nimish R. Shah, San Rafael, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 849 days.

(21) Appl. No.: 11/404,184

(22) Filed: Apr. 14, 2006

(51) Int. Cl.
*H04W 24/00* (2009.01)
*H04B 1/00* (2006.01)

(52) U.S. Cl. .................. 455/423; 455/63.1; 455/67.11; 455/67.7; 455/115.1

(58) Field of Classification Search .............. 455/423, 455/63.1, 67.11, 67.7, 115
See application file for complete search history.

(56) References Cited

U.S. PATENT DOCUMENTS

| | | | |
|---|---|---|---|
| 5,362,298 A * | 11/1994 | Brown et al. ............... | 482/137 |
| 5,526,291 A | 6/1996 | Lennen | |
| 5,987,320 A | 11/1999 | Bobick | |
| 6,052,584 A | 4/2000 | Harvey et al. | |
| 6,088,659 A | 7/2000 | Kelley et al. | |
| 6,104,983 A | 8/2000 | Nakada | |
| 6,219,340 B1 | 4/2001 | Cutler et al. | |
| 6,519,227 B1 | 2/2003 | Koizumi | |
| 6,850,238 B2 * | 2/2005 | Bryant et al. ............. | 345/440.1 |
| 7,162,396 B2 * | 1/2007 | Nakada et al. ............. | 702/189 |
| 7,352,713 B2 * | 4/2008 | Koizumi et al. ............ | 370/320 |
| 7,400,673 B2 * | 7/2008 | Franke ........................ | 375/224 |
| 7,603,290 B1 * | 10/2009 | Tenorio ....................... | 705/26 |

FOREIGN PATENT DOCUMENTS

WO    WO 03/107566 A1    12/2003

OTHER PUBLICATIONS

Raymond A. Birgenheier, "Overview of Code-Domain Power, Timing, and Phase Measurements", Hewlett-Packard Journal, vol. 47, No. 1, Feb. 1996, pp. 73-93.
Data sheet for Anritsu MS8607A, available from Anritsu America Inc., 365 W Passaic St., Rochelle Park, NJ 07662-3017, Date: at least as early as Apr. 23, 1998.
Data sheet for IS-95 CDMA Transmission Characteristics Measurement Functions, available from Advantest America Inc., 3201 Scott Blvd., Santa Clara, CA 95054-3008, Jan. 1997.

* cited by examiner

*Primary Examiner* — Wen Huang

(57) ABSTRACT

A method for displaying multiple orthogonal code layers on a display device wherein a first axis is indicative of the identity of the code channel of a signal and a second axis is indicative of a measured value of the code channel signal. The method includes displaying a bar for each of a plurality of base code channel signals, the bar having a position on the first axis corresponding to the base code index of the base code channel signal and a height with respect to the second axis corresponding to a measured value of the base code channel signal; and displaying a tie line for each group of base code channels in an active channel, the tie line being located intermediately to the ends of the bars.

12 Claims, 2 Drawing Sheets

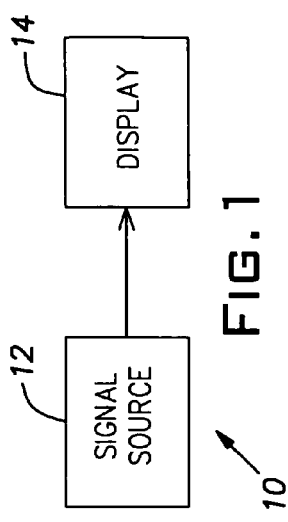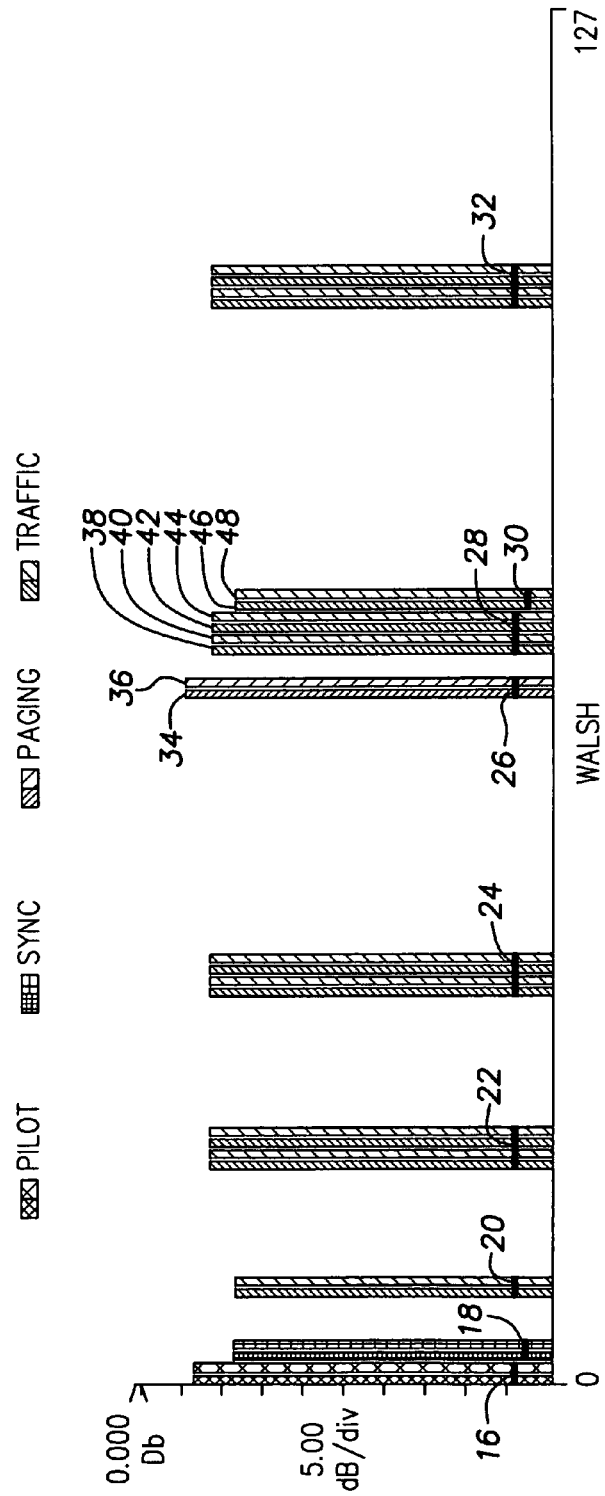

CODE DOMAIN POWER DISPLAY

BACKGROUND OF THE INVENTION

The present invention relates to the display of code domain signals and, in particular, to the display of multiple code layers.

Orthogonal codes are used in communication systems to create channels. Different symbol rates create different code channel layers, each having associated code channels. Examples include code division multiple access (CDMA) signals and wideband-CDMA (W-CDMA) signals. These signals are useful in, for example, cellular telephone communication systems. CDMA code channels are derived from Walsh functions and W-CDMA are derived from orthogonal variable spreading factor (OVSF) codes.

The complexity of these signals creates a challenge for displaying measurements of the signals involved in these communication systems.

SUMMARY OF THE INVENTION

A method for displaying multiple orthogonal code layers on a display device wherein a first axis is indicative of the identity of the code channel of a signal and a second axis is indicative of a measured value of the code channel signal. The method includes displaying a bar for each of a plurality of base code channel signals, the bar having a position on the first axis corresponding to the base code index of the base code channel signal and a height with respect to the second axis corresponding to a measured value of the base code channel signal; and displaying a tie line for each group of base code channels in an active channel, the tie line being located intermediately to the ends of the bars.

BRIEF DESCRIPTION OF THE DRAWINGS

FIG. 1 is a block diagram of a display system having a display according to the invention.

FIG. 2 is an example of a display according to the invention.

DESCRIPTION OF THE PREFERRED EMBODIMENTS

Figure 3:
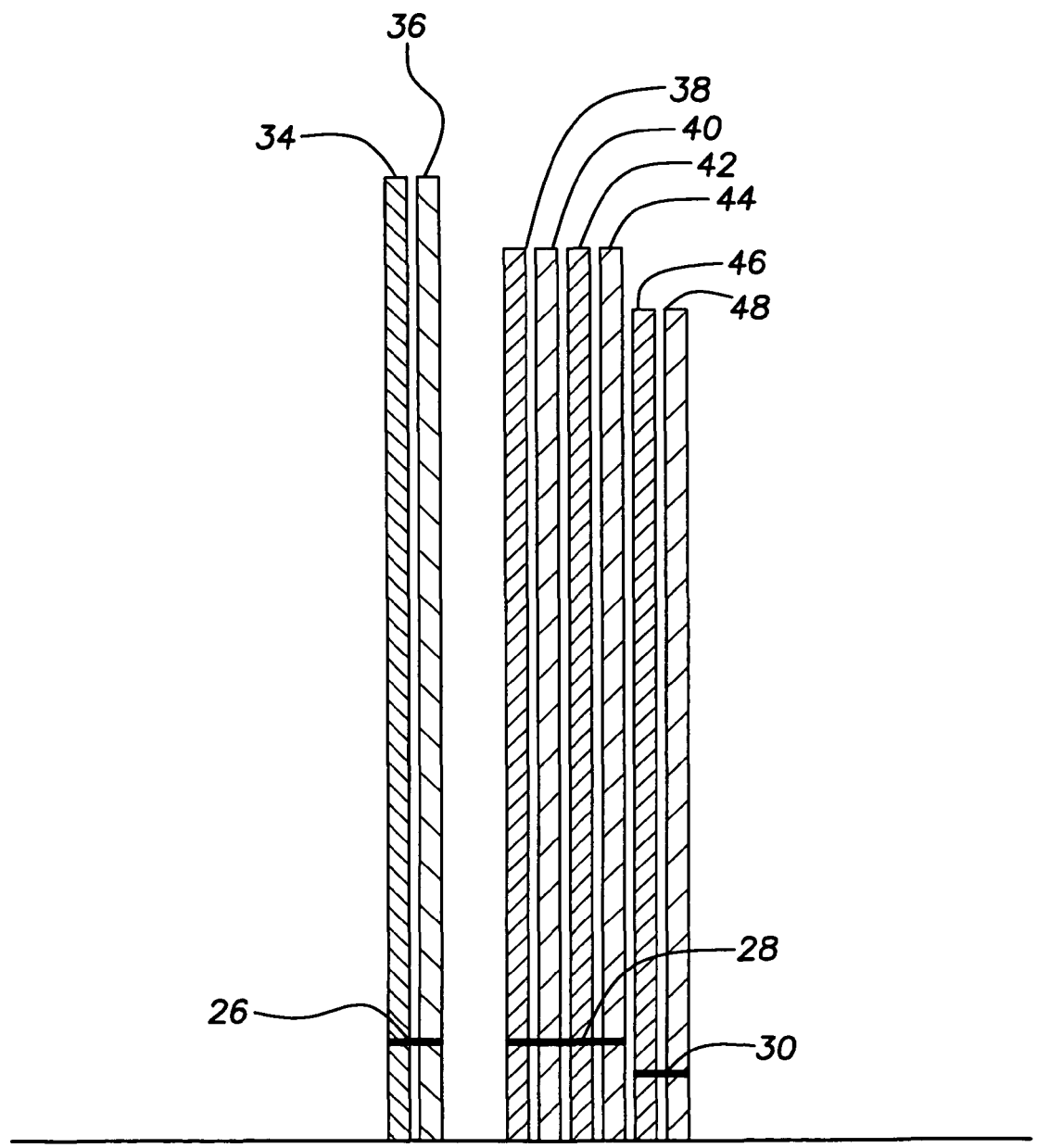
FIG. 3 is the portion A of FIG. 2 shown in an enlarged scale.

Referring to FIG. 1, a display system 10 for displaying multiple orthogonal code layers includes a signal source 12 and a display 14. The signal source 12 provides measured values for each of many channels of an orthogonally coded communications system. For example, the channels may be from a CDMA or W-CDMA system. The measured values may be, for example, power or amplitude for each of the channels, or any other desired measurement suitable for displaying in a bar graph.

The display 14 may be, for example a CRT, a LCD, a plasma display, a LED array, or other display suitable for displaying at least two dimensional data. In one embodiment of the invention, the display 12 may also advantageously display data in differing colors. In addition, the display 14 and the signal source 12 include circuitry to translate signals from the signal source 12 to visual indicia on the display 14.

When a code channel is active on a code layer other than the highest spread factor code layer (i.e., the base code layer), the highest spread factor code channels (i.e., the base code channels) which compose the active code channel will be adjacently located. Due to the way orthogonal codes are layered, the number of base code channels in an active channel in other than the base code layer will be a power of two. However, because each code channel, no matter what the layer, is still composed of base code channels, the code channel may be described in terms of the constituent base code channels. Each code channel will be made up of one or more base code channels that each have a base code index that is associated with the spread factor.

Referring to FIGS. 2 and 3, a display 14 is used to display, for example, channel measurements of a CDMA communications system. The base code index, for example, runs from 0 to 127. Each vertical bar represents a base code channel whose vertical height indicates, for example, the power measured in that channel. The bars are arranged on the horizontal axis according to base code index. It is of course possible to reverse the orientation of the axes.

Each group of base code channels in an active channel is indicated by a respective tie-line 16, 18, 20, 22, 24, 26, 28, 30, 32 that "ties" the group of base code channels in a particular active channel together, even though the active channel may be in a different layer. The tie lines are located between the ends of the bars. The locations of the tie lines may be varied to avoid confusion with adjacent tie lines. For example, tie line 28 and tie line 30 are vertically offset to provide visual contrast between the active channels they represent. Using this arrangement, tie lines at two distinct heights can be used to unambiguously identify the group of base code channels in any active channel.

It is of course possible to use additional tie line heights if desired. It is also possible to use other ways of making a visual contrast between the tie lines, for example, different colors, different line patterns/thicknesses, varying flash rates and other similar methods of creating visual contrast may be used.

In communications systems using orthogonal codes, certain channels are often used for a particular function. For example in CDMA systems, there may be channels for pilot, synchronization, paging and traffic data or in W-CDMA systems CPICH, PCCPCH, SCCPCH, PICH and DPCH data.

These functions can be indicated on the display 14 by the use of visual contrast techniques as outlined above. For example, each function can be indicated by the use of one or more similar colors (e.g., shades of particular color indicate a particular function) or similar patterns (e.g., the inclusion of a particular crosshatch angle indicates a particular function). For example, the channels 34, 36 have an appearance that indicates they are used for paging and channels 38, 40, 42, 44, 46, 48 have an appearance indicating they are used for traffic. It should of course be understood that the hatching in FIGS. 2 and 3 can also be considered an indication of colors.

In some cases, it may be desirable to provide additional visual contrast between adjacent bars. For example, if it is desired to minimize the size of the display 14, then it may be that the displayed bars are only one pixel wide and there are no pixels available to place between bars.

To provide additional visual contrast between bars, the visual contrast techniques outlined above may be employed. Where visual resolution permits, any of these techniques may be employed. Where resolution is limited, for example, adjacent bars may advantageously be of different colors, including shades of "gray."

For example, each of the bars in FIGS. 2 and 3 are in pairs where the first member of the pair is one crosshatch/color and the second member is a similar but different crosshatch/color. For example, if "yellow" indicates "traffic," then traffic channels 38, 40, 42, 44, 46, 48 could alternate between a dark shade and a light shade of yellow and if "green" indicates "paging," then channels 34, 36 can be a dark shade of green and a light shade of green, respectfully.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for displaying multiple orthogonal code layers on a display device wherein a first axis is indicative of the identity of the code channel of a signal and a second axis is indicative of a measured value of said signal, said method comprising:
   displaying a bar for each of a plurality of base code channel signals, said bar having a position on said first axis corresponding to the base code index of said base code channel signal and a height with respect to said second axis corresponding to a measured value of said base code channel signal; and
   displaying a tie line for each group of base code channel signals in an active channel, said tie line laterally intersecting all of said bars of said group intermediately to the ends of said bars of said group at a position characterized by a distance along said second axis;
   wherein the position of said tie line for each group is chosen such that tie lines in adjacent groups are at different positions with respect to one another.

2. A method according to claim 1, wherein adjacent bars are visually contrasting.

3. A method according to claim 2, wherein adjacent bars are different colors.

4. A method according to claim 1, wherein bars corresponding to channels having the same function have similar appearance.

5. A method according to claim 4, wherein said similar appearance includes having a differing shade of a color indicative of a particular function.

6. A method according to claim 1, wherein tie lines of adjacent active channels are visually contrasting.

7. A display for displaying multiple orthogonal code layers, said display comprising:
   a first axis indicative of the identity of the code channel of a signal;
   a second axis indicative of a measured value of a said signal;
   a bar display for each of a plurality of base code channel signals, said bar display having a position on said first axis corresponding to the base code index of said base code channel signal and a height with respect to said second axis corresponding to a measured value of said base code channel signal; and
   a tie line display for each group of base code channels in an active channel, said tie line display laterally intersecting all of said bars of said group intermediately to the ends of said bar displays corresponding to said group at a position characterized by a distance along said second axis;
   wherein the position of said tie line for each group is chosen such that tie lines in adjacent groups are at different positions with respect to one another.

8. A display according to claim 7, wherein adjacent bar displays are visually contrasting.

9. A display according to claim 8, wherein adjacent bar displays are different colors.

10. A display according to claim 7, wherein bar displays corresponding to channels having the same function have similar appearance.

11. A display according to claim 10, wherein said similar appearance includes having a differing shade of a color indicative of a particular function.

12. A display according to claim 7, wherein tie line displays of adjacent active channels are visually contrasting.

* * * * *